June 10, 1969  W. M. JONAS  3,448,464
ATTACHMENT OF PLASTIC FASTENERS TO FABRIC ARTICLES
Filed April 17, 1967
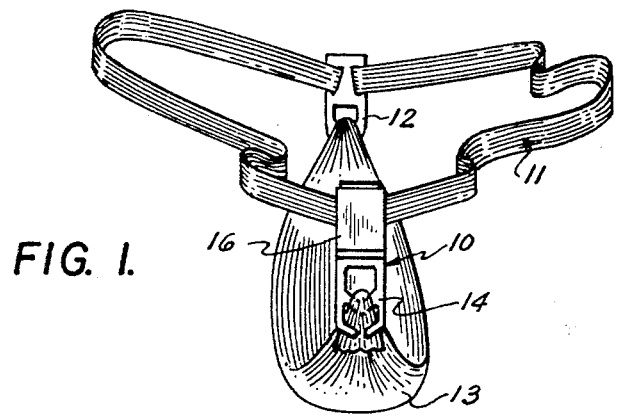
FIG. 1.
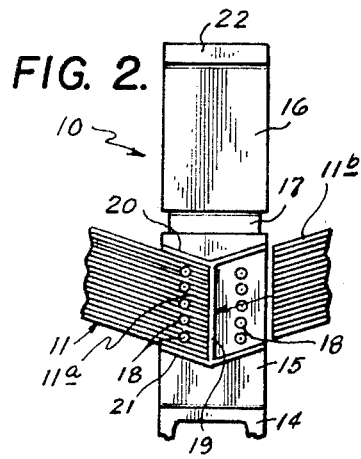
FIG. 2.
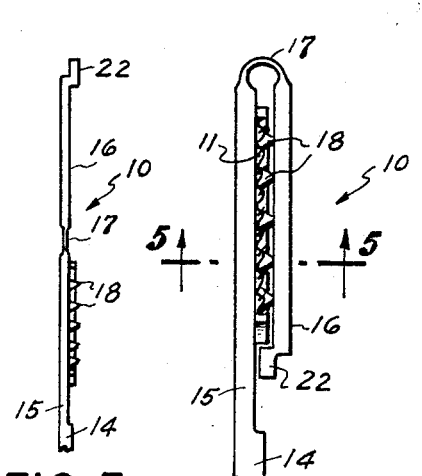
FIG. 3.
FIG. 4.
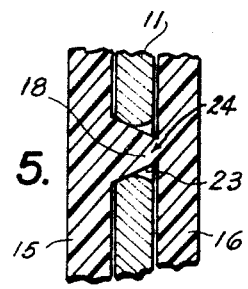
FIG. 5.
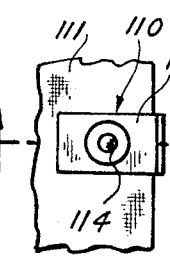
FIG. 6.
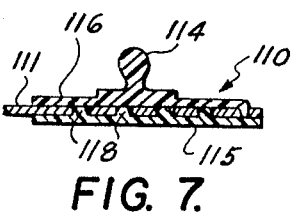
FIG. 7.
INVENTOR
WALTER M. JONAS
BY
ATTORNEY United States Patent Office 3,448,464
Patented June 10, 1969

3,448,464
ATTACHMENT OF PLASTIC FASTENERS
TO FABRIC ARTICLES
Walter M. Jonas, Easton, Pa., assignors to Sobel Metal Products Inc., West Easton, Pa., a corporation of Pennsylvania
Filed Apr. 17, 1967, Ser. No. 631,270
Int. Cl. A41f 1/00, 19/00
U.S. Cl. 2—336          1 Claim

ABSTRACT OF THE DISCLOSURE

A fastener member of thermoplastic resin has two plate-like portions disposed against opposite sides of a pierceable fabric, at least one of such portions having pointed projections to pierce the fabric and engage the other plate-like portion, such projections and the plate-like portion engaged thereby being fused to each other, as by the application of thermal energy, high-frequency electrical energy or high-frequency vibrational energy, so as to join together the plate-like portions with the fabric secured therebetween.

---

This invention relates generally to the attachment of plastic fasteners or the like to fabric articles.

Although there has been widespread use of plastic materials for various types of fasteners, such as, buckles, snap fasteners, clasps, garter grips and the like, the attachment of such plastic fasteners to fabric articles has continued to present problems. In some instances, for example, as disclosed in my U.S. Patent No. 3,112,750, the plastic fastener is formed with a relatively thin tab which can be sewed-through for attaching the fastener to a fabric article. However, the sewing operation is relatively costly in that it is not susceptible to automated production techniques, and further results in a line of perforations in the thin plastic tab which weakens the latter. In those cases where the fabric article is itself formed of a plastic sheet material, plastic fasteners have been attached thereto by suitable adhesives, or by conventional sealing techniques employing thermal energy, high-frequency electrical energy, for example, dielectric heating, or high-frequency vibrational energy, for example, ultrasonic welding. However, such conventional sealing techniques cannot be employed when the fabric article is of a woven, knitted or netted textile made up of natural fibers and, even when the fabric article is of a plastic sheet material, a reliable bond with the plastic fastener may not be obtained if the respective plastic resins are not compatible or do not fuse at approximately the same temperatures.

Accordingly, it is an object of this invention to provide for the secure attachment of thermoplastic fasteners to fabric articles without limitation as to the material of which the latter are formed, so long as such material is capable of being pierced.

Another object is to effect such attachment of thermoplastic fasteners to fabric articles in a manner that is susceptible to the use of high-speed, automated production techniques.

In accordance with an aspect of this invention, a thermoplastic fastener is provided with two plate-like portions disposable against opposite faces of the fabric article to which the fastener is to be attached, at least one of the plate-like portions having pointed projections extending therefrom to pierce the fabric article and engage the other plate-like portion, and such projections are fused to the plate-like portion engaged thereby, for example, by the application of thermal, high-frequency electrical, or high-frequency vibrational energy, so as to join together the plate-like portions with the fabric article secured therebetween.

The above, and other objects, features and advantages of the invention, will be apparent in the following description of illustrative embodiment thereof which is to be read in connection with the accompanying drawing, wherein:

FIG. 1 is a perspective view illustrating the application of the invention to the attachment of a buckle to a length of elastic tape so as to form a belt assembly from which a catamenial or sanitary pad may be suspended;

FIG. 2 is an enlarged elevational view of a portion of the buckle shown on FIG. 1 at an intermediate stage in its attachment to the elastic tape;

FIG. 3 is a side elevational view of the portion of the buckle appearing on FIG. 2;

FIG. 4 is a further enlarged, side elevational view of the buckle portion embodying the invention, shown at a later stage of its attachment to the elastic tape;

FIG. 5 is an enlarged, detail sectional view taken along the line 5—5 on FIG. 4, but showing portions of the buckle fused together to complete its attachment to the elastic tape;

FIG. 6 is a front elevational view illustrating the application of the invention to the attachment of a snap-fastener element to a fabric article; and FIG. 7 is an enlarged sectional view taken along the line 7—7 on FIG. 6.

Referring to the drawing in detail, and initially to FIG. 1 thereof, it will be seen that a fastener 10 embodying the invention is there shown in the form of a buckle or clasp depending from the front of a belt 11 of elastic tape which also carries a back buckle or clasp 12 to constitute a sanitary belt assembly from which a catamenial or sanitary pad 13 may be suspended.

The lower or gripping portion 14 of buckle 10 which is intended for attachment to the fabric extension at one end of pad 13 may be formed substantially as described in detail in my U.S. Patent No. 3,051,178.

The buckle 10 may be injection molded, or otherwise formed, of a thermoplastic resin, such as, for example, vinyl ester resins, vinyl chloride-acetate copolymers, vinylaldehyde resin plastics, vinylidene chloride plastics, polyvinyl alcohol plastics, acrylic resins, polystyrene, and the like.

In accordance with this invention, buckle 10 includes, in addition to its gripping portion 14, two plate-like portions 15 and 16 at least one of which is molded integrally with gripping portion 14. In the illustrated embodiment, plate-like portion 15 extends from gripping portion 14 (FIGS. 2 and 3) and is joined, at its end remote from portion 14, by way of a relatively thin web 17 constituting a bendable hinge portion, to plate-like portion 16. Thus, buckle 10 can be conveniently molded in one piece with its portions 14, 15 and 16 lying substantially in a common plane, and portion 16 can be angularly displaced, by bending of hinge portion 17, from the common plane with portion 15 to a position (FIG. 4) in which it parallelly confronts portion 15.

At least one of plate-like portions 15 and 16, for example, the portion 15, as shown, is formed with an array of pointed projections 18 to extend toward the other plate-like portion 16 when the latter parallelly confronts portion 15. Further, when the positioning of the buckle 10 with respect to the fabric article to which it is to be attached is critical, as is the case when such fabric article is in the form of the belt 11 of elastic tape, one of plate-like portions 15 and 16 may also be formed with ridges or other projections to locate the fabric article relative to pointed projections 18. Thus, in the illustrated embodiment, plate-like portion 15 has a central ridge 19 and upper and lower V-shaped ridges 20 and 21 extending from the ends of ridge 19 (FIG. 2) to define areas for receiving the ends 11a and 11b of elastic tape 11 within which pointed projections 18 are located.

The free end edge 22 of portion 16 is preferably offset, as shown (FIGS. 3 and 4), so that, when portion 16 is in the position of FIG. 4 and spaced from portion 15 by projections 18, edge 22 nears portion 15.

In attaching the above described buckle 10 to belt 11, the ends 11a and 11b of the length of elastic tape to form the belt are laid in the areas of plate-like portion 15 defined by ridges 19–21 (FIG. 2) and thus made to overlie pointed projections 18. Either before or during the angular displacement of plate-like portion 16 from its molded position (FIGS. 2 and 3) to its active position (FIG. 4), portion 15 and ends 11a and 11b of belt 11 are pressed toward each other, whereby pointed projections 11 pierce the fabric of the belt, as at 23 on FIG. 5, and engage the inner surface of portion 16 in its active position (FIG. 4). Thereafter, the tips of projections 18 are fused to plate-like portion 16 engaged thereby, as at 24 on FIG. 5, and similarly the offset edge 22 of portion 16 is fused to portion 15 so as to permanently join plate-like portions 15 and 16 with the fabric of ends 11a and 11b of the belt securely anchored therebetween.

The fusing of projections 18 to portion 16 and of offset edge 22 to portion 15 may be effected in any conventional way, as by the suitable application of thermal energy, high-frequency electrical energy or high-frequency vibrational energy, using conventional tools or devices suitable therefor.

Since buckle 10 is attached to belt 11 by the fusing together of two portions of the buckle, as described above, it is apparent that the security of such attachment is not dependent upon the compatibility of the materials employed for the belt and buckle. Thus, although the buckle is formed of thermoplastic resin, the belt or other fabric article to which it is attached may be of natural or synthetic materials which may be woven, knitted or netted, or even in the form of an imperforate, flexible sheet so long as the latter is pierceable by the pointed projections 18 to permit the latter to engage and be fused to the plate-like portion 16.

Although portion 16 is shown integral with portion 15 in the buckle 10 for attachment to a narrow fabric article such as the belt 11, it is apparent that portions 15 and 16 may be separately formed and disposed at opposite sides of the fabric article prior to being joined by fusing of the projections 18 to portion 16 after such projections have pierced the fabric article. Such separate or separable formation of plate-like portions 15 and 16 may be required when the fabric article is of large extent, for example, is in the form of a garment, and is to have one or more fasteners in accordance with this invention joined thereto at a free edge of the garment.

Thus, as shown on FIGS. 6 and 7, a fabric article 111 may be provided with a fastener 110 in accordance with this invention which includes plate-like portions 115 and 116 disposed at opposite sides of fabric article 111 and joined together by the fusing to portion 116 of pointed projections 118 extending from portion 115 and piercing the fabric article thereby secured between portions 115 and 116. As shown on FIGS. 6 and 7, the gripping portion 114 of the fastener may be formed integral with plate-like portion 116 rather than with the plate-like portion 115 from which projections 118 extend. Such gripping portion 114 may be in the form of an element of a snap fastener, as shown, or it may constitute at least a part of any other fastener capable of being formed of thermoplastic resins, such as, for example, a strap buckle as shown in my U.S. Patent No. 3,112,750, a clasp, or a garter grip.

What is claimed is:

1. The combination of an elongated tape, and a fastener member of thermoplastic resin for attachment to said tape including first and second plate-like portions disposed against opposite faces of said tape, at least one of said plate-like portions having pointed projections extending therefrom and piercing said tape, said projections piercing the tape being fused to the other of said plate-like portions to join said first and second plate-like portions with said tape secured therebetween, and at least one of said plate-like portions having ridges thereon spaced apart to receive said tape therebetween for locating the tape precisely with respect to said projection.

References Cited

UNITED STATES PATENTS 2,267,585    12/1941    Churchill _____ 24—265.1
3,247,848    4/1966    Mathison _____ 128—171

JORDAN FRANKLIN, *Primary Examiner.*

GEORGE V. LARKIN, *Assistant Examiner.*

U.S. Cl. X.R

24—150, 243, 265; 128—171